Feb. 3, 1970  I. SIMON  3,492,738
APPARATUS FOR MEASURING SMALL DEVIATIONS FROM A
TRUE HORIZONTAL PLANE
Filed Aug. 29, 1967  6 Sheets-Sheet 1

INVENTOR.
Ivan Simon
BY
Attorney

Feb. 3, 1970   I. SIMON   3,492,738
APPARATUS FOR MEASURING SMALL DEVIATIONS FROM A
TRUE HORIZONTAL PLANE
Filed Aug. 29, 1967   6 Sheets-Sheet 2

INVENTOR.
Ivan Simon
BY
Attorney

Feb. 3, 1970     I. SIMON     3,492,738
APPARATUS FOR MEASURING SMALL DEVIATIONS FROM A
TRUE HORIZONTAL PLANE
Filed Aug. 29, 1967     6 Sheets-Sheet 3

INVENTOR.
Ivan Simon
BY
Attorney

INVENTOR.
Ivan Simon
BY
Attorney

INVENTOR.
Ivan Simon
Attorney

INVENTOR.
Ivan Simon
BY
Attorney

United States Patent Office 3,492,738
Patented Feb. 3, 1970

3,492,738
APPARATUS FOR MEASURING SMALL DEVIATIONS FROM A TRUE HORIZONTAL PLANE
Ivan Simon, Belmont, Mass., assignor to Arthur D. Little, Inc., Cambridge, Mass., a corporation of Massachusetts
Filed Aug. 29, 1967, Ser. No. 664,137
Int. Cl. G01c 9/00, 9/02, 9/06
U.S. Cl. 33—206   10 Claims

ABSTRACT OF THE DISCLOSURE

An apparatus adapted continuously to measure and record small deviations from a true horizontal plane such as those deviations which may occur continuously or recurrently as a result of ground motion and the like. The apparatus comprises a diamagnetic body suspended in a magnetic field of a configuration which constrains the body radially but permits it to move axially within certain limits. The amount of axial movement is used as a measure of horizontal deviation. The suspension is frictionless, and the apparatus may be made to be relatively rugged and stable over extended periods of time.

---

The instrument of this invention is designed continuously to measure and record deviations from a true horizontal reference plane from being exactly orthogonal to the vector of local gravity. The term "true horizontal plane" is used herein to define a plane which is exactly perpendicular to the local vertical direction such as defined for example by a plumb line. Thus, in effect, the instrument measures the horizontal component of the acceleration of gravity. The magnitude of any such deviations to be measured may be extremely small, and the phenomena to be evaluated which bring about such deviations may have either very long periods or be aperiodic and proceed at very slow rates. Thus, such instruments must have reliable long-term stability. Instruments suitable for such measurements are generally referred to as "tiltmeters," and this generic term will be used hereinafter for convenience in describing the apparatus of this invention.

Tiltmeters have a number of different uses, and the following are given as examples of some of these. A tiltmeter may be used to determine the response of the ground or a structure to loadings and hence to indicate the suitability of an area for heavy construction or the ability of a bridge to bear weight. They may be used to indicate the stability of foundations of buildings, of dams, of slopes in open pit mining or of underground mining operations. Tiltmeters may also be employed in accurately positioning large scientific apparatus such as telescopes, particle accelerators, etc. The property to measure the response of the ground to loads may also be used to determine the weight of large vehicles and the like.

One class of tiltmeters now in use depends upon measuring the change in level of water or mercury in a tube. All other presently available tiltmeters make use of a pendulous mass suspended on fine fibers or elastic hinges. This latter class of instruments measures the displacement of the mass due to the acceleration or force required to restore the mass to its initial position. Because of material limitations which are inherent in the highly compliant suspension elements, they tend to be extremely fragile instruments and to be subject to undesirable drifts in the zero point. The titlmeter of this invention eliminates the drawbacks associated with the prior art devices by the use of a diamagnetic mass which is suspended in a magnetic field in which the normal elastic forces are replaced by field forces. The mass is, therefore, free to respond to accelerations without any trace of friction of external or internal origin. The absence of friction makes it possible to construct the instrument so that it is highly responsive while remaining relatively rugged. Moreover, when the instrument is construced properly, it can be made to remain highly stable over indefinite periods of time.

In constructing the tiltmeter of this invention, it is necessary to levitate an elongated mass in a field which exhibits both vertical and transverse gradients. Any axial shift in the mass brought about through the effective tilting of the instrument can be measured and used to determine the actual tilt of the base and hence its deviation from the predetermined horizon. Some damping of the axial shift may be desirable, and in some of the modifications of the apparatus of this invention means for accomplishing such damping are provided as well as means for restoring the mass to a null position.

It is, therefore, a primary object of this invention to provide an improved tiltmeter capable of continuously making extremely accurate measurements of the deviation of the instrument base from a true horizontal plane. It is another object of this invention to provide apparatus of the character described which is relatively rugged, free from any frictional forces, and remains stable over indefinite periods of time within reasonable limits of environmental variables. It is another object of this invention to provide an improved geophysical instrument in which a tiltmeter is incorporated for making measurements. Other objects of the invention will in part be obvious and will in part be apparent hereinafter.

The invention accordingly comprises the features of construction, combinations of elements, and arrangement of parts which will be exemplified in the constructions hereinafter set forth.

For a fuller understanding of the nature and objects of the invention, reference should be had to the following detailed description taken in connection with the accompanying drawings in which FIGS. 1–3 are diagrammatic cross sections through pole pieces of the tiltmeter of this invention showing three different configurations of the pole pieces and of the diamagnetic body serving as the mass;

The operation of the tiltmeter of this invention is illustrated in diagrammatic fashion in FIGS. 1-4; while actual tiltmeter apparatus are shown in detail in FIGS. 9-14. It will be appreciated that in FIGS. 1-8 no attempt has been made to draw the components to scale and that the sizes of the various components have been somewhat enlarged for ease of illustration.

Figure 1:
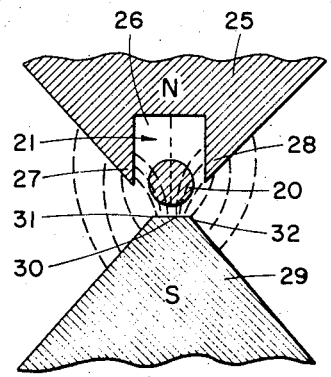

FIG. 1 illustrates how a mass of a diamagnetic material such as an elongated cylinder 20 may be suspended in a properly designed magnetic field 21. In order to achieve the desired levitation of the mass 20, it is necessary to provide a magnetic field which has a vertical gradient decreasing upwardly, as well as symmetrical transverse gradients which are substantially uniform along the axis of the mass. In FIG. 1 the lines of flux have been drawn in to illustrate the flux gradient, and from these lines it will become apparent that the magnet is so arranged as to strongly constrain the diamagnetic mass in the transverse direction while leaving it free to move without friction in the axial direction. As will become apparent in the following detailed description, the axial movement is measured and used as a means for evaluating deviation of the suspended mass from the true horizontal plane.

The desired magnetic field is achieved by use of an upper pole piece 25 in which there is a groove 26 having edges 27 and 28 which, according to well-known physical principles, effects a concentration of the magnetic flux. A lower pole piece 29 is provided and in the modification of FIG. 1 is seen to terminate in a narrow, flat surface 30, which provides edges 31 and 32 aligned with edges 27 and 28 to achieve the desired lateral flux gradient as well as the vertical gradient. It will be appreciated that these edges need not be sharp but may be rounded to optimize magnetic saturation in the polepiece material.

Figure 2:
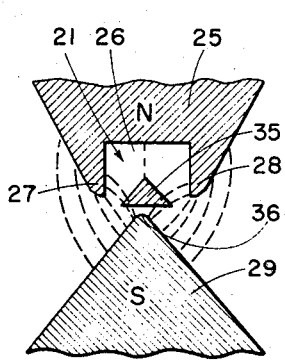

FIG. 2 shows a modification of the basic arrangement of FIG. 1 and illustrates the use of a triangularly shaped diamagnetic mass 35. In this modification, in which like numbers refer to like elements, the bottom pole piece terminates in a single edge 36 which is symmetrically positioned with respect to edges 27 and 28 of upper pole piece 25.

Figure 3:
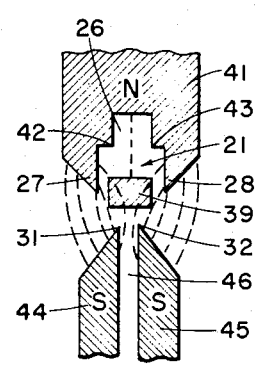

FIG. 3 illustrates yet another modification of the pole piece configurations as well as the use of a rectangularly shaped diamagnetic mass 39. In the arrangement of FIG. 3, the upper pole piece 41 has a groove 26, which is cut in a stepped configuration which presents a second pair of flux concentrating edges 42 and 43. The lower pole piece is provided in the form of symmetrical halves 44 and 45, the edges of which are aligned with edges 27 and 28. The lower pole pieces are positioned in spaced relationship to define a narrow passage 46 between them.

The mass when formed of a diamagnetic material may be levitated in the manner illustrated in FIGS. 1-3 provided certain requirements are met. The condition of levitation in a magnetic field may be written as $$\tfrac{1}{2}\nabla \overline{H^2} - \frac{\rho g}{|\chi|} = 0$$

where the average of $H^2$ is taken over the volume of the suspended body. $\chi$ is its diamagnetic susceptibility, $\rho$ its density, and $g$ is the acceleration of gravity. Thus, the magnetic field must be of sufficient strength to overcome the gravitational force exerted on the diamagnetic mass. In practice, the value of $\nabla \overline{H^2}$ is limited by the size and the energy product $(BH)_{max}$ of the magnet. It is also, of course, desirable to use a material for the mass which has the lowest possible value of $\rho/\chi$. Pure graphite has been found to be the best diamagnetic material for the mass, although other materials may be used. These other materials include, but are not limited to, fused quartz, boron, beryllium, and certain other metals, glasses and liquids, the latter being contained within suitable tubing. It is, of course, well known that a superconductor has the highest value of diamagnetic susceptibility, and it is within the scope of this invention to employ a superconducting mass and provide means for maintaining the tiltmeter at a temperature sufficiently low to maintain the mass superconducting.

Figure 9:
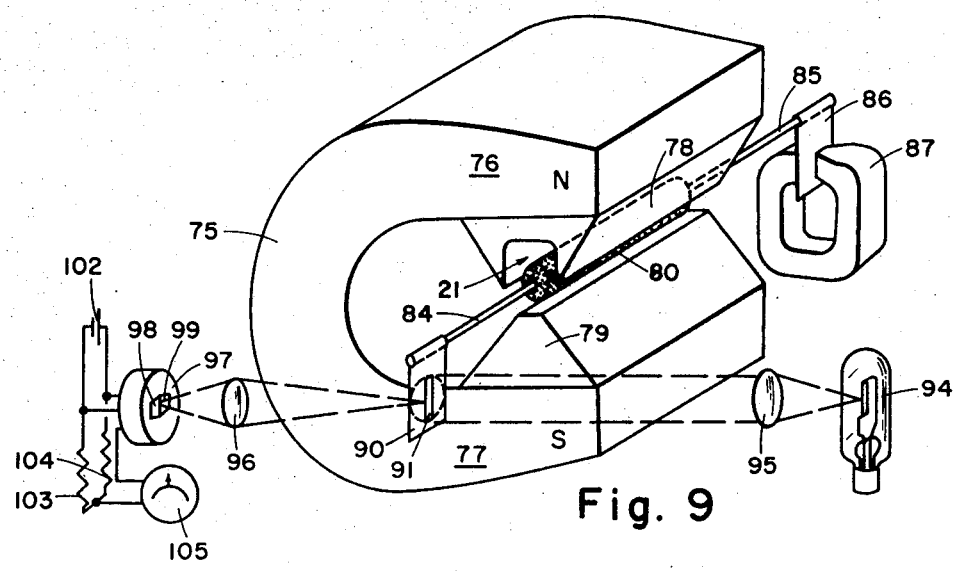
FIG. 9 is a perspective view of one embodiment of a tiltmeter constructed in accordance with this invention using a single permanent magnet and one form of detecting means.
Figure 10:
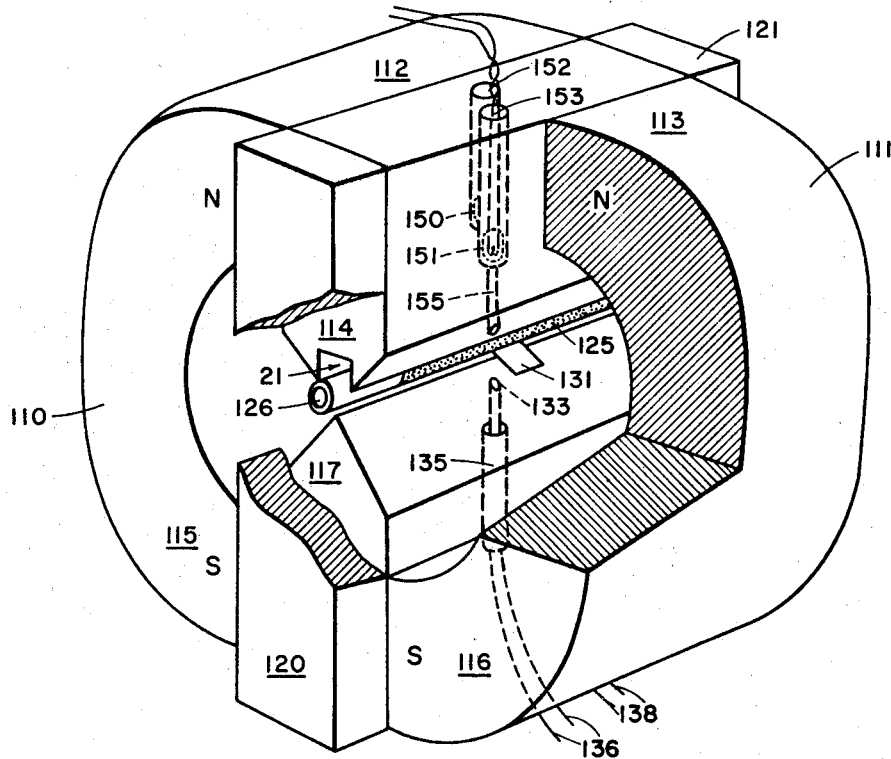
FIG. 10 is a perspective view, partially cut away, of another embodiment of a tiltmeter constructed in accordance with this invention showing the use of two permanent magnets and another embodiment of detecting means.

The actual size of the diamagnetic mass will, of course, depend upon the size of the magnet or magnets used and the magnetic properties of the pole pieces as well as the diamagnetic susceptibility of the mass. As an example, tiltmeters have been constructed as shown in FIGS. 9 and 10 using graphite rods one-tenth inch in diameter and about one inch long as the diamagnetic mass and a horse shoe shaped magnet having an overall length of approximately three inches and a volume ranging between two and four cubic inches.

Figure 4:
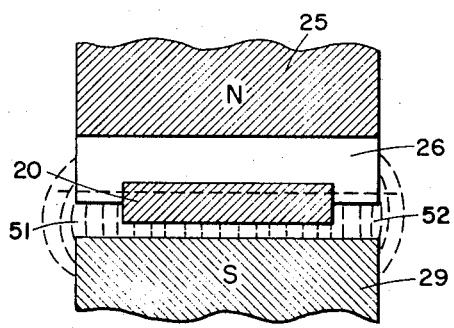
FIG. 4 is a diagrammatic longitudinal cross section of the pole pieces of FIG. 1.
Figure 5:
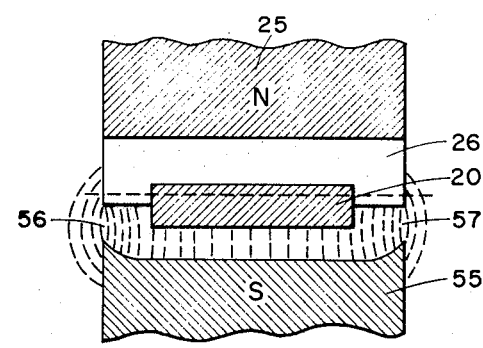
FIGS. 5 and 6 are diagrammatic longitudinal cross sections of pole pieces showing modifications in pole piece construction for limiting or restraining the axial motion of the diamagnetic mass.
Figure 6:
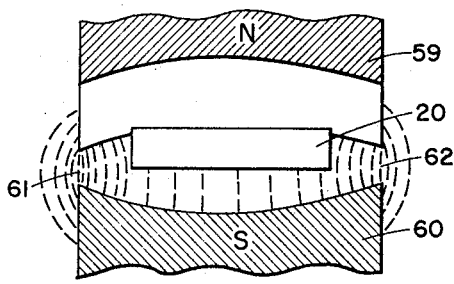
Figure 7:
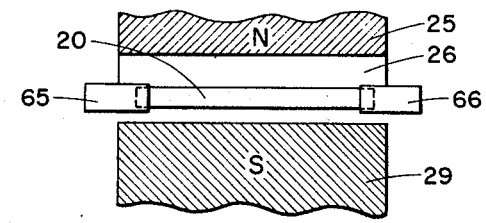
FIG. 7 shows the use of electrically conducting caps on the diamagnetic mass for damping.
Figure 8:
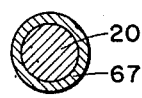
FIG. 8 is a cross section of the diamganetic mass showing the use of a copper shield.

It will be seen from FIG. 4, which is a longitudinal cross section of the arrangement of FIG. 1, that the two ends 51 and 52 of the gap defined by the pole pieces 25 and 29 in which the magnetic field is established are so constructed as to offer no constraining forces to the axial movement of the suspended mass 20. Thus, in such an arrangement without any axial constraints, the mass may be shifted far enough to one side or the other to enter an unstable condition and escape by one or the other end. It is, therefore, necessary that some means be provided to provide at least a slight constraining force along the axis of the diamagnetic mass to restore it to a null or central position. A number of axial constraining and restoring means are available. FIGS. 5 and 6 illustrate modifications in the configurations of the pole pieces to achieve axial constraint and restoration. FIGS. 7 and 8 illustrate modifications in the construction of the diamagnetic mass to accomplish damping of the axial motion of the diamagnetic mass through the use of eddy currents.

Once the suspended mass has moved in the axial direction and its motion detected and recorded, it is necessary that its further motion be limited by a force equal and opposite in direction to that resulting from the tilt. It is also necessary to constrain its axial motion within certain limits to permit this restoration. Such constraining and restoring means must be capable of opposing the axial motion of the suspended mass and of providing a force proportional to the displacement of the mass. Two modifications in pole piece configurations to provide the required constraining and restoring forces are illustrated in FIGS. 5 and 6.

In FIG. 5 the lower pole piece 55 is modified such that the ends are higher and hence closer to edges 27 and 28 than is the edge or edges along the central portion of the pole. This then establishes a magnetic flux gradient in which the strongest flux exists at the ends 56 and 57. Therefore, as the mass 20 shifts from its central position to either the left or the right, it encounters stronger magnetic fields, its axial movement is opposed, and the mass is constrained within the gap defined by the pole pieces and restored to a central position.

In FIG. 6 the upper and lower pole pieces 59 and 60 are cut such that they are in effect concave which brings about a more gradual change of the flux gradient between the ends 61 and 62 and hence effects a more uniform restoring force acting on the mass. Ideally, the concave shape of the pole pieces should be designed to cause the restoring force to increase proportionally with the displacement of the diamagnetic mass from its initial position.

It is also necessary to provide suitable damping means which in effect provide a dragging force which opposes the motion of the suspended mass and which is proportional to the velocity of the axial motion. In contrast to the constraining and restoring forces which effect a conservation of energy, the damping forces effect a dissipation of energy in the form of heat.

FIGS. 7 and 8 illustrate modifications which may be made on the suspended mass 20 to achieve the required damping through the use of eddy currents. In FIG. 7 the mass is seen to have thin caps 65 and 66 on each end formed of an electrically conducting nonmagnetic material such as aluminum or copper. Alternatively, the entire mass 20 may be encased in an electrically conducting material 67 as illustrated in FIG. 8. Such damping means are used in the tiltmeter modifications shown in FIGS. 10 and 14; while FIG. 9 illustrates the use of an external magnetic field for damping. The manner in which these damping means function will be described in detail in the discussion of the various embodiments and modifications of the tiltmeter.

A tiltmeter constructed in accordance with this invention is illustrated in detail in FIG. 9. There is provided a permanent horseshoe magnet 75 having a north pole 76 and a south pole 77. In keeping with well-known practice, an upper pole piece 78, formed of a highly magnetically permeable material such as a soft iron or iron-cobalt alloy, is affixed to the upper pole, and a suitably shaped lower pole piece 79, also formed of a highly permeable material, is affixed to the south pole to achieve the desired gap configuration to define the magnetic field 21 as shown in cross section in FIG. 1. An elongated cylindrical piece of graphite 80 serves as the diamagnetic mass. Lightweight rods 84 and 85 (formed of a non-magnetic material such as aluminum) are affixed to the two ends of the mass 80. On rod 85 is attached a lightweight vane 86, formed of aluminum or other non-magnetic material, which is held in position in the gap of a small auxiliary magnet 87 to serve as a damping means to slow down the axial movement of mass 80. On the other end of the mass 80 is positioned a means for detecting axial movement of the mass. This comprises a thin vane 90 (e.g., of aluminum) of a weight equal to that of the vane 86. A narrow slit 91 is cut in vane 90. Light from a suitable source such as light bulb 94 is directed by means of lens 95 onto slit 91; and that light which passes through slit 91 is collected by means of lens 96 to be directed onto a differential photoresistor device 97 which has two photosensitive cells 98 and 99. A DC current is supplied to the cells from a suitable source such as battery 102, and each of the cells has associated with it a resistor 103 and 104; and a millivoltmeter 105, or other differential signal detecting means, is placed in the circuit.

In the absence of any axial movement of the mass 80, i.e., when the mass is in its null position, light from source 94 passing through slit 91 is made to fall equally on cells 98 and 99, and the millivoltmeter 105 reads zero. When, however, the mass moves in an axial direction, the position of slit 91 is altered with respect to cells 98 and 99, thus shifting the balance within the differential photoresistor and hence within the resistors 103–104. This shift in balance is registered on millivoltmeter 105 as a measure of the axial movement of the mass.

Figure 11:
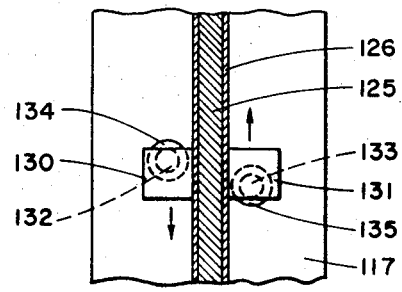
FIG. 11 is a fragmentary cross section through the diamagnetic mass of the apparatus of FIG. 10.

FIGS. 10 and 11 illustrate another modification of the tiltmeter of this invention. In this modification two permanent magnets 110 and 111 are provided, and the two north poles 112 and 113 are affixed to a common upper pole piece 114 while the two south poles 115 and 116 are affixed to a common lower pole piece 117. The magnetic field 21, defined by the gap between the two pole pieces, is effectively closed in by means of the end pieces 120 and 121 typically constructed of soft iron or an iron-cobalt alloy.

In the tiltmeter of FIGS. 10 and 11, the mass is seen to be a long cylinder of graphite 125 covered throughout its length with a thin copper sheath 126 to achieve eddy current damping.

Axial movement of the mass of FIGS. 10 and 11 is detected optically. Mounted on either side of the central section of the mass are small light-weight vanes 130 and 131 (see FIG. 11). These are positioned so that the edges of the vanes coincide with the opposite edges of two staggered photoresistive light sensors 132 or 133. These sensors are so positioned that the sensor 132 on the left side (FIG. 11) is adapted to detect axial motion in the direction of the arrow associated with vane 130; while the sensor on the right side is adapted to detect axial motion in the direction of the arrow associated with vane 131. The light sensors are positioned within channels 134 and 135 drilled on either side of the lower pole piece 117, and suitable leads from these sensors 136 and 138 are provided for connection to an external circuit suitable for detecting the amount of radiant energy reaching the sensors 132 and 133. Such a circuit is shown in FIG. 13 and described below in detail.

Light is provided to the detecting system of FIG. 10 by means of two small radiant energy sources such as light bulbs 150 and 151 positioned within channels 152 and 153 drilled in the uper pole piece. It will, of course, be obvious to those skilled in the art that a single source of radiant energy may be used rather than the two separate sources of FIG. 10. Thus, the beam from a single source may be split using well-known optical elements, e.g., mirrors, and the two beams directed into channels 152 and 153. Smaller diameter channels such as 155 shown in FIG. 10 communicate with the larger channels containing the light source and are so aligned as to direct light onto the sensors 132 and 133 as the vanes move axially.

When the tiltmeter is in its null or normal position, vanes 130 and 131 will just completely cover the sensors 132 and 133. With any axial movement, however, one of these sensors is uncovered, and the differential voltage produced by the imbalance of their output becomes a measurement of the movement of the vane and hence of the mass 125.

Figure 13:
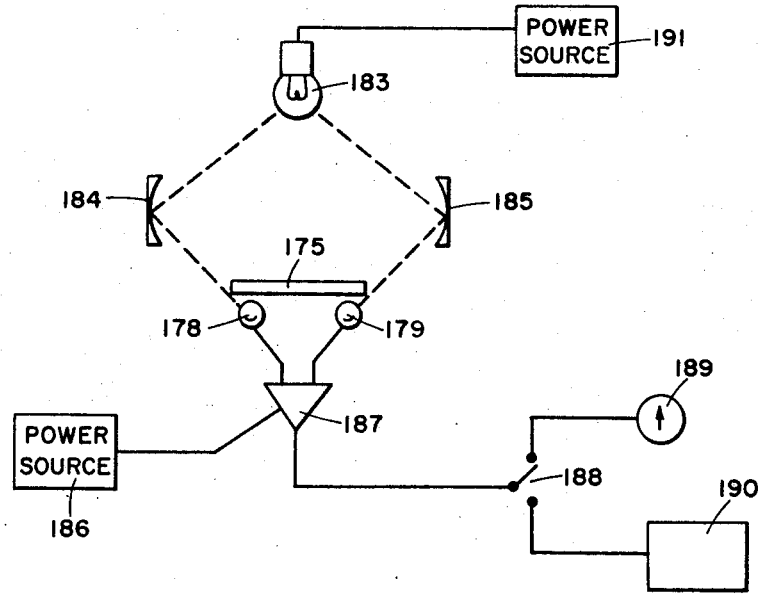
FIG. 13 is a circuit diagram for the readout and recording mechanism associated with the tiltmeter of FIG. 12.
Figure 12:
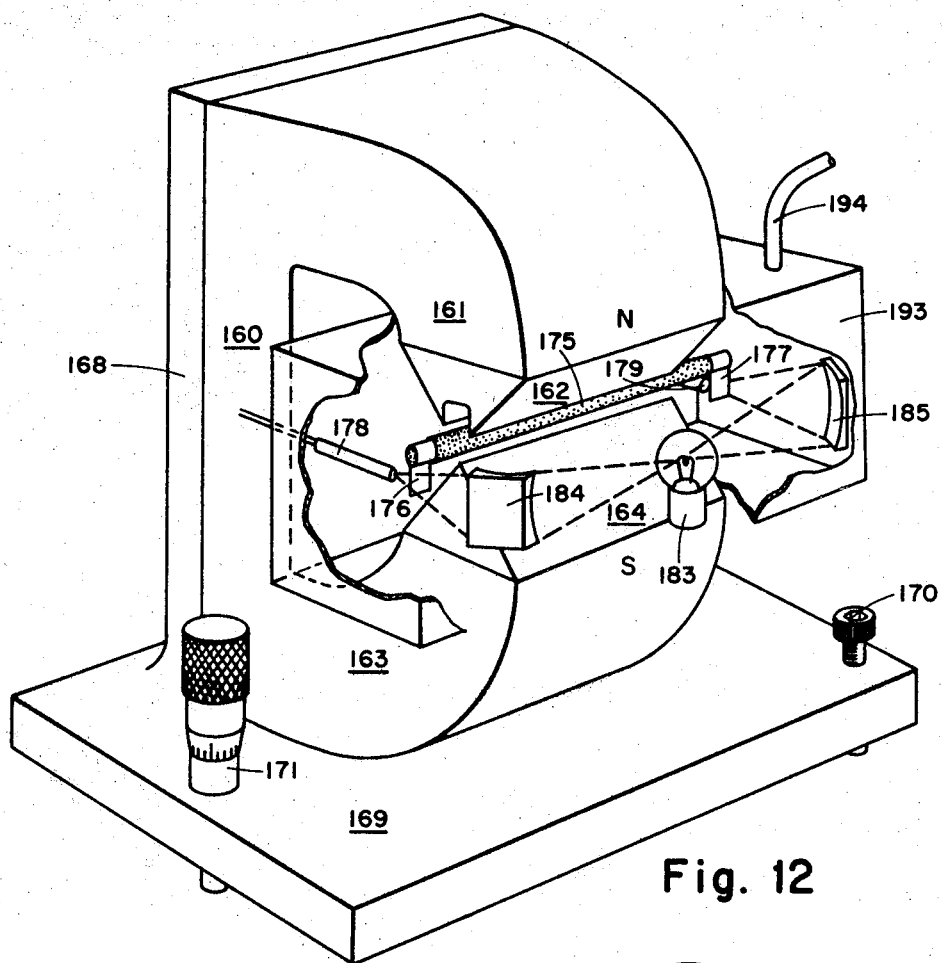
FIG. 12 is a perspective view of an embodiment of the tiltmeter having yet another type of detecting means and incorporating means for controlling the environment around the magnetic field.

In the modification of the tiltmeter shown in FIGS. 12 and 13, another means for detecting axial motion of the diamagnetic mass is shown. Means are also provided for controlling the atmosphere around the pole pieces, the mass, and a portion of the detecting elements. The primary purpose for controlling the atmosphere around the mass is to minimize the effects of ambient temperature fluctuations, eliminate dust and convective air currents as well as to control precisely the amount of radiant energy reaching the detecting system.

In the modification of FIG. 12, the diamagnetic mass field is obtained through the use of a single permanent magnet 160, the north pole 161 of which is affixed to a suitable contoured upper pole piece 162 and the south pole 163 to a lower pole piece 164. The magnet 160 is attached to a vertical support 168, which may be made integral with a base 169. The base, and hence the tiltmeter, is leveled by means of two screws 170 (one which is shown) and a fine adjustment screw 171.

In the modification of FIG. 12, the diamagnetic mass 175 is seen to extend beyond the confines of the gap defined between the two pole pieces, and on the ends of the seismic mass are hung lightweight vanes 176 and 177 preferably made of aluminum foil. These vanes are positioned such that the outer edge is aligned with an associated photodiode 178 and 179 of the silicon n-p-n type.

A light source 183 is provided, and two concave mirrors 184 and 185 are placed diametrically opposite to the light source to project two separate beams of light, which are alternately obstructed by the vanes attached to the seismic mass. The focal length of the mirrors is such as to form two equally bright images of the light source filament on the two photodiodes. As will be seen in FIG.

13, the photodiodes 178 and 179 are connected in a circuit supplied from a precision regulated power source 186 and including a differential amplifier 187 which in turn may be connected through switch 188 to a microammeter 189, to a chart recording self-balancing potentiometer 190 or to both these output detecting devices. Power is supplied to the light source 183 from any suitable power source 191. Alternatively, the precision regulated power source 186 may supply power to the light source 183 as well as to the diodes. Regulation better than 0.01 percent line and load voltage variation in the power source 186 must be provided to operate the device. The bridge output is typically of the order of 100 mv. (with a 10,000 ohm load) for a 0.1 mm. displacement of the diamagnetic mass.

Since it is desirable to protect the diamagnetic mass and the detecting system from atmospheric convections, ambient light and dust, external magnetic fields, etc., enclosure 193 is positioned around the mass, the radiant energy source and optical elements of the detecting means. The enclosure is made of any suitable nonmagnetic material, and if it is made fluidtight, it is possible to introduce into the enclosure through a suitably valved conduit 194 a fluid to surround the mass. Thus, for example, a fluid of proper viscosity may be used to provide the necessary damping forces to oppose the motion of mass 175.

Although damping may be achieved through the use of a viscous fluid, it is preferably accomplished through the establishment of suitable eddy currents. In order to make the eddy current damping sufficiently strong, the diamagnetic mass must exhibit good electrical conductivity. If the mass were made of beryllium, for example, it is possible that the conductivity of this metal might be satisfactory for the purpose. However, in the case of graphite, the conductivity is much lower and the induced eddy currents in a graphite mass are not strong enough to cause effective damping. Therefore, it is necessary to enhance its electrical conducting properties. This can be done most conveniently by attaching to the diamagnetic mass an electrically conducting, nonmagnetic member or members such as the end caps 65 and 66 of FIG. 7 or the enclosing sheath 67 of FIG. 8. Such members are preferably formed of aluminum or copper. As the mass with the electrically conducting member moves through the nonuniform magnetic field, an electrical current is induced within the conducting member and the current circulates in a manner as to oppose the motion of the conductor and hence the diamagnetic body with which it is associated. Thus, the axial motion of the mass is damped by the opposing force.

Figure 14:
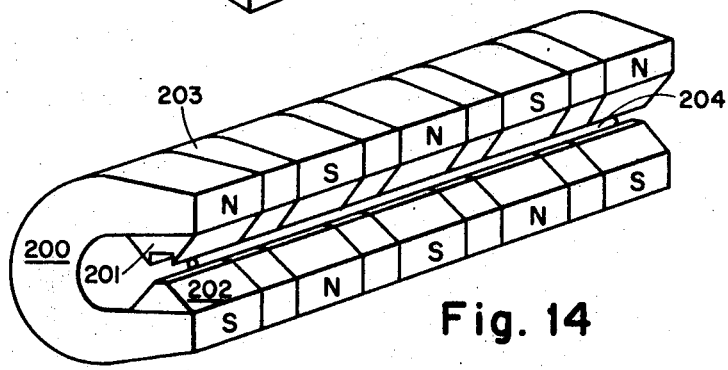
FIG. 14 illustrates a modification of the field generating means of a tiltmeter constructed in accordance with this invention in which a series of magnets are used to generate eddy currents for damping.
Figure 15:
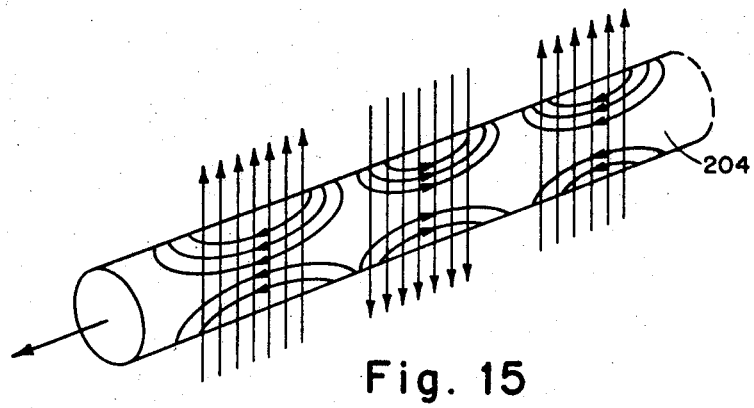
FIG. 15 illustrates diagrammatically the magnetic fields and eddy currents developed in the arrangement of FIG. 14.

The configuration shown in FIG. 14 is designed to achieve an improved form of eddy current damping. In the arrangement of FIG. 14, the eddy currents are induced in a copper sheathed diamagnetic mass 204 as it moves along the axis. This is achieved by using a plurality of identical magnets 200 with nonmagnetic spacers 203 retaining them in spaced relationship. The magnets are so arranged as to alternate polarity, and the upper pole piece 201 and lower pole piece 202 are constructed of contoured elements in accordance with the requirements of the invention. The non-magnetic spacers 203 are of such a thickness that the magnetic leakage flux between the magnets of opposed polarity does not substantially detract from the flux in the working gap. As the diamagnetic mass 204 moves along its axis, the volume elements located between the adjacent magnets will see a reversal of flux and, consequently, eddy currents will be induced in them as shown schematically in FIG. 15.

Figure 16:
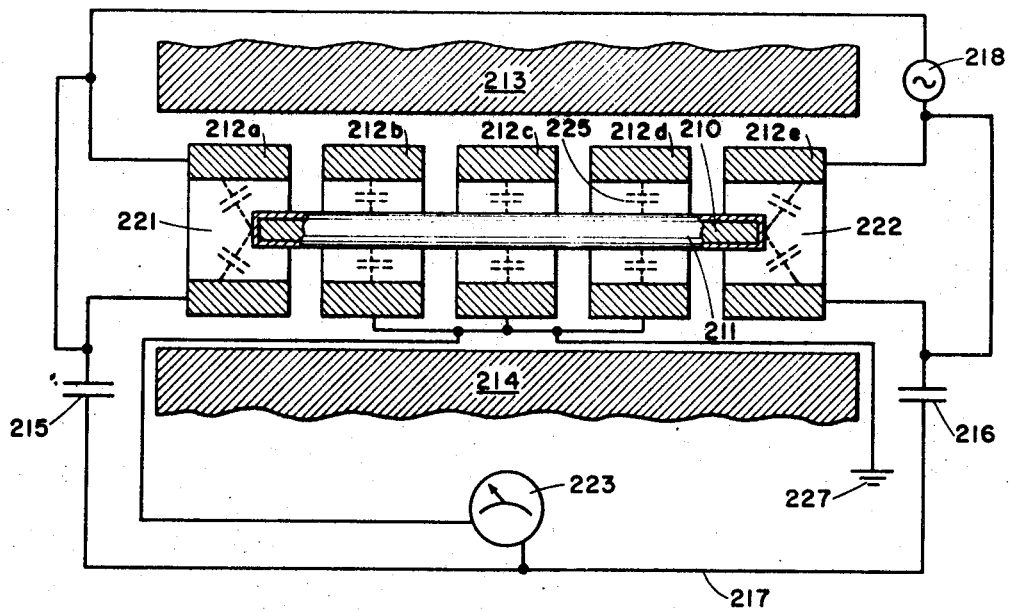
FIG. 16 is a circuit diagram of a tiltmeter using capacitors in the readout circuit.

FIG. 16 illustrates another embodiment of displacement detection and readout which is based upon capacitance measurement rather than upon electro-optical effects. In the arrangement of FIG. 16, the mass 210, which may be covered with a copper sheath 211, is positioned within a plurality of cylindrical electrodes 212a–212e, located within the gap defined by a north pole 213 and a south pole 214 constructed in accordance with the requirements discussed previously. The electrode 212a at the extreme left end and the electrode 212e at the extreme right end are electrically insulated from the remaining electrodes located between them, and they are interconnected with capacitors 215 and 216 forming a capacitance bridge circuit 217, which is supplied with AC power from a suitable AC power source such as 218 operating in the audio or radio frequency range. When the electrically conducting mass 210 is centered between the electrodes in its null position, the stray capacitances 221 and 222 are equal, the bridge 217 is balanced, and no voltage is recorded by millivoltmeter 223. The connection between the mass and the inner electrodes, which are grounded by ground 227, is provided by the inherent capacitances 225. Any axial movement of mass 210 is reflected by a change in the stray capacitances and is detected on millivoltmeter 223.

The magnets shown in the drawings of the various embodiments and modifications of this device have been illustrated as permanent magnets. It is, of course, within the scope of this invention to use electromagnets in place of the permanent magnets shown, and such interchange is within the knowledge of one skilled in the art.

Figure 17:
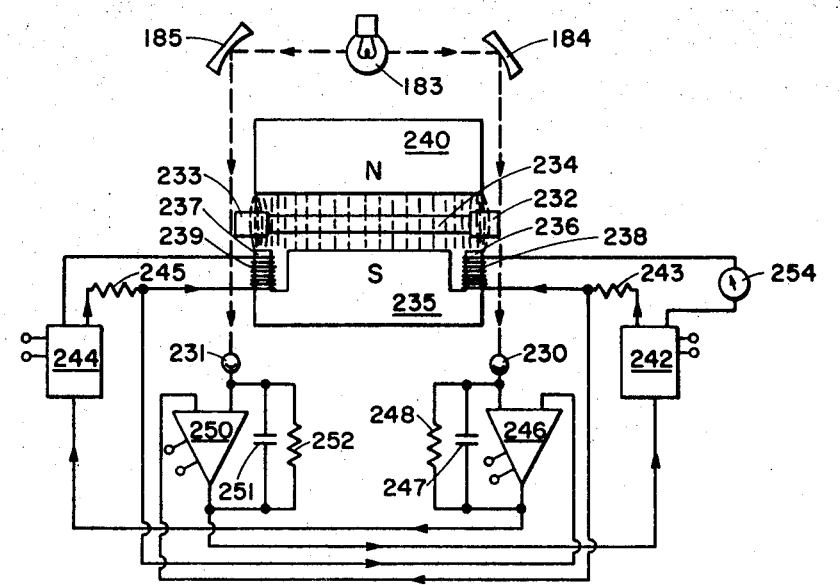
FIG. 17 illustrates a tiltmeter which incorporates a zero-rebalance servo system.

FIG. 17 shows the tiltmeter equipped with a zero-rebalance servo system which automaticaly forces the suspended diamagnetic mass back to the position of initial zero after the instrument has been tilted. The advantage of such a system is that it greatly increases the range over which tilts can be measured, all the way from a fraction of a second of arc to a few degrees. Embodied in the device of FIG. 17 is a modification of the magnet pole pieces which permits the axial gradient of the magnetic field to be made stronger or weaker at will by a DC control current.

In the device of FIG. 17, the optical portion of the detecting means is essentially that of FIG. 12 and includes a radiant energy source 183 and two mirrors 184 and 185 aligned with photocells 230 and 231 and the aluminum caps 232 and 233 affixed to the ends of a graphite cylinder 234 serving as the diamagnetic mass. The lower pole piece 235 is modified at either end to include electromagnets 236 and 237 having coils 238 and 239, respectively. In like manner, the upper pole piece 240 may be so modified to include electromagnets in addition to or in place of the electromagnets 236 and 237 associated with the lower pole piece.

Coil 238 is connected to a circuit which includes a current amplifier 242 and resistor 243; and in like manner, coil 239 is part of a circuit including current amplifier 244 and resistor 245. Photocell 230 is connected to a differential amplifier 246 which has a feedback loop comprising capacitor 247 and resistor 248 in parallel; and photocell 231 is connected to a differential amplifier 250 which has a feedback loop comprising capacitor 251 and resistor 252 in parallel. It will be seen that differential amplifier 246 is also connected to current amplifier 244 and coil 239; while differential amplifier 250 is connected to current amplifier 242 and coil 238, the connections between the differential amplifiers and the coils providing current feedback loops. A DC current is provided to the amplifiers in the usual manner from a source not shown.

In the operation of the tiltmeter of FIG. 17, currents are passed through both coils 238 and 239 in a direction such as to reinforce the fields generated by the permanent magnets associated with the pole pieces. The fields at the ends of the pole pieces are thus made stronger similar to the situation shown in FIGS. 5 and 6. Now, if one of the currents in either coil 238 or 239 is made stronger, the stronger field generated by the corresponding electromagnet will push the diamagnetic mass toward the center of the suspension; similarly, making the current weaker will permit the diamagnetic mass to move outwards, away from the center.

If the instrument is tilted so that the mass 234 shifts, say, to the right, the left-hand photocell 231 receives more light, and the left-hand differential amplifier 250 generates larger output voltage. This voltage is fed into the right-hand current amplifier 242 causing it to pass stronger current through the coil 238 on the right and the mass is forced to the left, back to the initial zero position. The current feedback loop delivers a voltage proportional to the restoring current to the other input of left-hand differential amplifier 250 and causes the mass promptly to reach the initial zero position to be held there as long as the instrument remains tilted. The purpose of the feedback loops associated with the differential amplifiers is to make the servo system more stable and less sensitive to rapid fluctuations. It is therefore preferred that the resistors 248 and 252 and capacitors 247 and 251 have suitably long-time constants. It is apparent that this action is reinforced by the symmetrically corresponding other half of the circuit. The actual tilt is measured by the strength of the current passing through either coil at balance and indicated by a milliameter 254.

Figure 18:
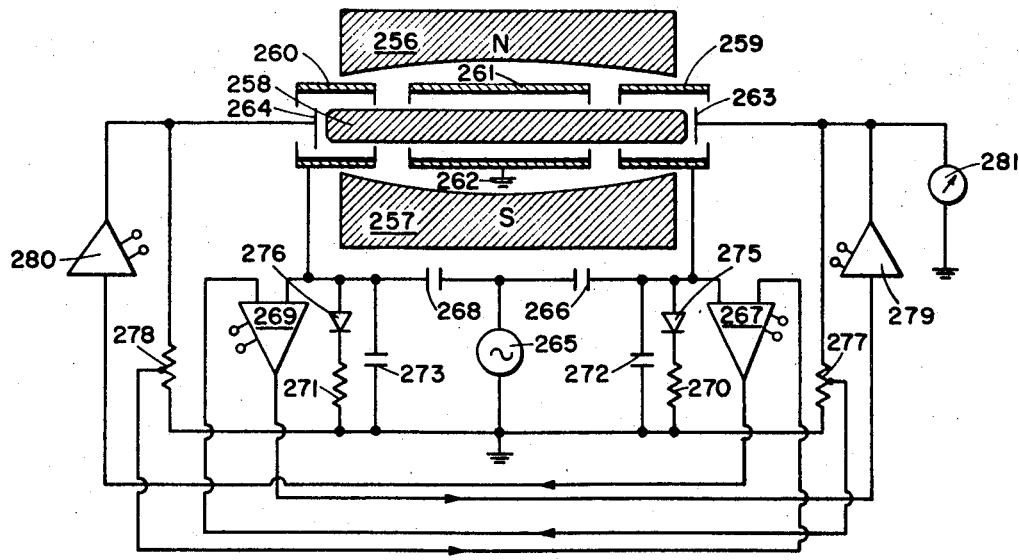
FIG. 18 illustrates another modification of the tiltmeter having a zero-rebalance system employing a capacitance displacement detection system.

In FIG. 18 there is another kind of zero-rebalance system shown which employs the capacitance displacement detection system described earlier in conjunction with FIG. 16. The force acting upon the mass according to the system shown in FIG. 18 is of electrostatic nature rather than of magnetic nature as illustrated in FIG. 17. This force results from applying a voltage to an electrode located near the end of the suspended mass.

In the arrangement of FIG 18 two pole pieces 256 and 257, designed according to FIG. 6, define the magnetic gap with the desired flux pattern, and a copper-sheathed graphite rod 258 serves as the diamagnetic mass. Interposed between the mass and the pole pieces are two end cylindrical electrodes 259 and 260 and a central electrode 261, this last electrode being connected to ground 262. Electrostatic forcer electrodes 263 and 264 are positioned within the terminal electrodes 259 and 260, and they are made part of a zero-rebalance servo system which functions similarly to that of FIG. 17. This servo system is comprised of an AC source 265 and a capacitor 266 and differential amplifier 267 associated with terminal electrode 259; and of a capacitor 268 and differential amplifier 269 associated with terminal electrode 260. The differential amplifiers 267 and 269 are provided with feedback loops comprising resistors 270 and 271 and capacitors 272 and 273 in parallel which have suitably long-time constants as in FIG. 17.

The charged electrodes 263 and 264 of whatever polarity will induce charges of equal size and opposite polarity on the surface adjacent to the electrodes. Thus, the charging of one of the electrodes will cause the mass 258 to be attracted to that electrode. In this way it is possible to exert force on the mass in order to counteract its displacement caused by tilting the instrument. This electrostatic forcing system is, as indicated above, made a part of a zero-rebalance servo system. Since the displacement detection system employs AC current rather than DC, the imbalance in voltage in either side of the system is rectified by diodes 275 and 276 before it is applied to the input of the corresponding differential amplifier. In the feedback loops of this system, the feedback voltages are derived from resistive voltage dividers 277 and 278 connected to control electrodes 263 and 264; and voltage amplifiers 279 and 280 are provided in the electrostatic forcer electrode circuits. A millivoltmeter 281 is illustrated as representative of means for reading out the axial movement of the dimagnetic mass.

It is obvious that components of the systems shown in FIGS. 17 and 18 may be interchanged so that, for example, the photoelectric displacement sensor is combined with the electrostatic forcing system, or the capacitance displacement sensor is used in connection with the electromagnetic forcer. It is also within the scope of this invention to incorporate into the devices of FIGS. 16, 17, and 18 any suitable readout and recording means as illustrated in FIG. 13.

It is also to be understood that any of the embodiments and modifications of the tiltmeter of this invention may be constructed to have pole pieces of the various configurations illustrated in FIGS. 1-6 and diamagnetic masses in any of the forms illustrated. Moreover, any other configurations for the pole pieces and/or diamagnetic mass which achieves the necessary radial constraint of the mass while permitting its desired controlled axial movement may be used.

The tiltmeter of this invention can be made into a rugged and stable instrument; and because of the total absence of friction in the movement of the mass and the elimination of any actual suspending filaments or bands, the instrument will remain accurate and dependable over long periods of time.

It will thus be seen that the objects set forth above, among those made apparent from the preceding description, are efficiently attained; and since certain changes may be made in the above constructions without departing from the scope of the invention, it is intended that all matter contained in the above description or shown in the accompanying drawings shall be interpreted as illustrative and not in a limiting sense.

I claim:
1. An apparatus for measuring deviation from a true horizontal plane, comprising in combination
 (a) an elongated diamagnetic mass;
 (b) magnetic field generating means adapted to levitate said diamagnetic mass in a horizontal plane along its axis, the flux concentration of said magnetic field being essentially symmetrical along the axis of said mass and exhibiting vertical and transverse gradients whereby said mass is strongly constrained transversely but is free to move axially;
 (c) means adapted to provide a restoring force to said diamagnetic mass; and
 (d) means for detecting axial movement of said mass as a function of the inclination of the apparatus from said true horizontal plane.

2. An apparatus in accordance with claim 1 including means for damping said axial movement of said mass.

3. An apparatus in accordance with claim 1 including readout means associated with said means for detecting axial movement.

4. An apparatus for measuring deviation from a true horizontal plane, comprising in combination
 (a) an elongated diamagnetic mass;
 (b) magnetic field generating means adapted to levitate said diamagnetic mass in a horizontal plane along its axis, said magnetic field generating means including an upper pole piece defining a horizontal channel and a lower pole piece of a configuration to define with said upper pole piece a magnetic field having a flux concentration which is essentially symmetrical along the axis of said mass and which exhibits vertical and transverse gradients whereby said mass is strongly constrained transversely but is free to move axially;
 (c) means adapted to provide a restoring force to said diamagnetic mass;
 (d) means for damping said axial movement of said mass; and
 (e) means for detecting axial movement of said mass as a measure of the inclination of the apparatus from said true horizontal plane.

5. An apparatus in accordance with claim 4 wherein at least one of said pole pieces is contoured such that the distance between said pole pieces decreases at the ends thereof, thereby providing said means to provide a restoring force.

6. An apparatus in accordance with claim 5 wherein said pole pieces are concave in configuration.

7. An apparatus in accordance with claim 4 wherein said diamagnetic mass has associated therewith nonmagnetic electrically conducting means serving as said means for damping said axial movement of said mass.

8. An apparatus in accordance with claim 7 wherein said nonmagnetic electrically conducting means are metallic end caps attached to said diamagnetic mass and extending beyond the ends of said pole pieces.

9. An apparatus in accordance with claim 4 wherein said means for detecting axial movement of said mass comprises, in combination
(1) radiant energy source means;
(2) duplicate radiant energy responsive means adapted to generate signals proportional to radiant energy transmitted thereto from said source means;
(3) means associated with said diamagnetic mass, movable therewith and being adapted to control the quantity of said radiant energy transmitted to each of said radiant energy responsive means; and
(4) means adapted to receive said signals from said radiant energy responsive means and to produce a detectable signal which is a function of the difference between said signals received from said radiant energy responsive means.

10. An apparatus in accordance with claim 9 wherein said means associated with said diamagnetic mass comprises two vane members positioned centrally on opposite sides of said mass and in staggered relationship to each other whereby any movement of said mass causes one of said vanes to permit said radiant energy to be transmitted to its corresponding radiant energy responsive means.

References Cited

UNITED STATES PATENTS

| | | | |
|---|---|---|---|
| 1,937,223 | 11/1933 | Gattoni | 177—185 |
| 2,141,175 | 12/1938 | Dawson | 177—185 |
| 2,958,137 | 11/1960 | Mueller. | |
| 3,175,405 | 3/1965 | Doyle et al. | 73—517 |
| 3,225,608 | 12/1965 | Simon | 73—504 |
| 3,229,103 | 1/1966 | Rantsch et al. | |
| 3,287,676 | 11/1966 | Davis et al. | 335—306 |
| 3,358,377 | 12/1967 | Martin et al. | 33—206.5 |

WILLIAM D. MARTIN, JR., Primary Examiner

U.S. Cl. X.R.
33—125; 335—306